May 26, 1970     G. P. POWERS     3,514,339
DEFERRED ACTION BATTERY
Filed April 29, 1968
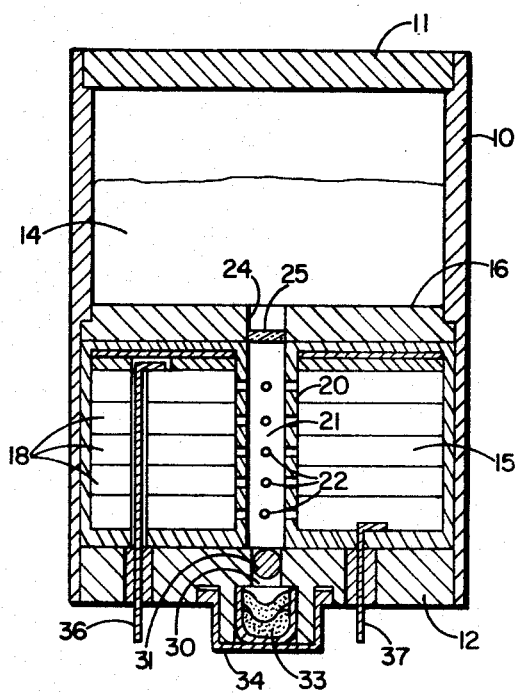
INVENTOR.
GERALD P. POWERS
BY *Alben Medwed*
ATTORNEY

United States Patent Office 3,514,339
Patented May 26, 1970

3,514,339
DEFERRED ACTION BATTERY
Gerald P. Powers, Philadelphia, Pa., assignor to Honeywell Inc., Minneapolis, Minn., a corporation of Delaware
Filed Apr. 29, 1968, Ser. No. 724,780
Int. Cl. H01m 21/10
U.S. Cl. 136—113                                 3 Claims

ABSTRACT OF THE DISCLOSURE

An activation means for a deferred-action electrochemical current-producing device wherein prior to activation electrolyte is held away from the electrodes by a frangible wall. Activation is achieved by explosively propelling an activation projectile towards the frangible wall causing the wall to collapse upon the impact with the ball.

BACKGROUND OF THE INVENTION

Field of the invention

A deferred-action type of primary battery wherein the action of the battery is prevented by a frangible barrier separating the electrodes and the electrolyte.

Description of the prior art

A substantial number of prior art patents show deferred-action type batteries, wherein activation is achieved by breaking the seal which separates the electrolyte from the electrodes. Representative of prior art are Pats. 2,832,-814 and 3,239,385. The first of the above patents shows a reserve type storage battery which is activated by manually breaking the seal, while the second patent shows a lance type initiating mechanism for a reserve battery. One of the obvious disadvantages of the manually activated battery is that it cannot be activated by remote control. One disadvantage of the lance initiating mechanism is that the lance, after piercing the diaphragm, remains in the port communicating between the electrolyte reservoir and the cell stack and thereby restricts the electrolyte flow from the reservoir to the battery cells. This results in a time delay in the activation of the battery. Another disadvantage is that the lance remains in the battery section after activation providing a conductive path. This results in increased intercell leakage.

SUMMARY OF THE INVENTION

The present invention will find use in the type of system where the electrolyte is separated from the battery structure until it becomes desirable to activate the battery. The word "battery" as used in this specification means either a single current-producing cell or a plurality of current-producing cells arranged in series or parallel, as the requirements of a particular situation may dictate. Separate compartments are provided for the electrolyte and for the battery cells. The electrolyte compartment may be a glass ampoule which upon being broken allows the electrolyte to enter into the cell stack. The electrolyte compartment may also be simply a portion of the battery case which is separated from the rest of the case by a frangible diaphragm constructed of glass or other frangible material. The present invention provides a means for breaking the ampoule or the frangible diaphragm.

The seal breaking mechanism comprises of an activation ball which is held at one end of the battery housing away from the frangible diaphragm or the ampoule. An explosive charge is placed behind the ball which upon initiation propells the ball toward the diaphragm or the ampoule with sufficient force to break the ampoule or the diaphragm upon impact. As the ball impacts with the diaphragm, it pierces the diaphragm and then continues on its way through the reservoir port. It thus does not obstruct the electrolyte flow, as happens to some degree with the lance initiating mechanism of the type shown in Pat. 3,239,385. In addition there is no conductive path in the center column of the cell stack thereby reducing intercell leakage.

The present invention finds its most advantageous use in a battery of the type shown in the preferred embodiment, wherein the electrolyte compartment is separated from the battery cells by a frangible diaphragm. The use of the present activation arrangement in such a battery offers the advantages normally gained by use of an ampoule without actually using an ampoule. As pointed out above, after breaking the diaphragm no obstruction is left to impede the electrolyte flow from the storage compartment into the battery cells and in addition intercell leakage is reduced by the absence of a lance. Presently the batteries using ampoules are limited in size by the size of the ampoule. Large ampoules will burst due to the electrolyte vapor pressure when their thin wall areas are increased.

It is therefore an object of the present invention to provide an improved activation mechanism for deferred-action batteries.

A further object of the present invention is to provide a means for rapid activation of such batteries, thus making it possible to maintain the battery in non-activated state until just prior to use.

These and other objects will become apparent to those skilled in the art of batteries upon examination of the following specification, claims, and a drawing in which the single figure illustrates the preferred embodiment of the present invention.

DESCRIPTION OF THE PREFERRED EMBODIMENT

Referring now to the drawing, a battery is shown having a housing with an external cylindrical shell 10. Shell 10 is constructed of material which is sufficiently strong to withstand the internal pressure caused by the electrolyte stored within. The cover member 11 closes the upper end of cylindrical shell 10. The bottom end is closed by a terminal plate 12 which carries the battery terminals and provides means for electrical connection from inside to the outside of the battery housing. The battery housing is divided into an upper segment 14 and a lower segment 15 by a bulkhead 16. The upper segment 14, at the end adjacent cover 11, comprises an electrolyte reservoir for storing the electrolyte prior to the activation of the battery. The lower segment 15, adjacent the end nearest terminal plate 12, contains a plurality of battery cells shown at 18. The cells are arranged around a central support 20 which is co-axial with cylindrical shell 10 and which extends the entire height of battery section 15. Support 20 has a central axial bore 21 along the entire length of the support member from terminal plate 12 to bulkhead 16. Support member 20 further has a plurality of apertures along its length, for fluid communication between the central bore 21 and the cell stack surrounding the central support.

Bulkhead 16 has a central opening 24 which is closed by a frangible diaphragm 25. Diaphragm 25 is constructed of material such as glass which will readily break upon impact with a hard object. The diameter of opening 24 in bulkhead 16 and diaphragm 25 corresponds roughly to the diameter of the bore 21 in support 20, and is directly in line with it so that upon breaking of diaphragm 25, the fluid from electrolyte compartment 14 is allowed to flow directly into central bore 21 and through apertures 22 into compartment 15 and cells 18. Located centrally on terminal plate 12 and in line with bore 21 is a bore 30 whose diameter is somewhat smaller from the diameter of bore 21. Pressed into bore 30 is a ball 31 constructed of heavy material such as, for example, stainless steel. The diameter of ball 31 is just slightly larger from the diameter of bore 30, so that the fit is very tight and the ball will normally be held in place unless it is pushed with substantial force. The position of ball 31 is in direct line with frangible diaphragm 25 at the opposite end of bore 21.

Behind ball 31, on the side away from the frangible diaphragm, terminal plate 12 provides an enclosure for a small quantity of explosive 33. A cap 34 covers the explosive compartment to hold explosive 33 in place.

Terminal plate 12 carries positive and negative terminals 36 and 37. Cells 18 are arranged in a series fashion, forming a cell stack. Terminal 36 is connected by means of a conductor to the upper end of the cell stack, while terminal 37 is connected to the lower end of the cell stack for providing an output voltage between terminals 36 and 37, upon activation of the battery, which depends on the number of cells 18 in the cell stack.

The explosive 33 shown in FIG. 1 is of the percussion type, which is initiated by a mechanical impact against cap 34. Quite clearly, other methods of initiating the explosive can be used, such as for example, electrical initiation.

OPERATION

The primary purpose of a battery, such as disclosed here, is to provide an electric power source which does not significantly deteriorate with time while it is not in use. A battery of this type may be allowed to stand, prior to activation, for long periods of time, without significantly degrading the battery operation. When the need for electric power arises, the battery may be activated almost instantaneously.

The activation and operation of the battery shown in FIG. 1 is accomplished as follows. Striking the central portion of cap 34 with a firing pin causes detonation of explosive 33. As a result, a considerable amount of pressure builds up behind the ball. When sufficient pressure is reached, the ball is ejected from bore 30, travels through bore 21 and strikes the glass diaphragm 25 causing it to fracture. Ball 31 is imparted sufficient velocity to continue on its flight after it destroys diaphragm 25, so that it will not obstruct the flow of fluid electrolyte into the cells.

In the preferred embodiment of the present invention, the fluid electrolyte is comprised of liquid ammonia. To facilitate the flow of ammonia into the cell stack, the electrolyte compartment 14 is pressurized with an inert gas, such as argon. The argon pressure forces liquid ammonia into the cell stack section and thus activates the battery.

The present method of battery activation could be used to fracture a glass ampoule. The preferred embodiment, however, essentially eliminates the ampoule and inherent useless void areas when a spherical ampoule is placed in a cylinder. While I have shown a preferred embodiment, it is obvious to those skilled in the art that many variations and embodiments are possible within the spirit of this invention. It is, therefore, understood that the specific embodiment of my invention shown here is for the purpose of illustration only, and that my invention is limited only by the scope of appended claims.

I claim:
1. A deferred-action electrochemical battery comprising:
   a sealed casing having a cylindrical shell closed at one end by a cover and at the other end by a terminal plate carrying a pair of terminals for connection to an external load;
   a bulkhead member dividing said casing into an electrolyte compartment and a battery compartment, the battery compartment being at the end of the casing adjacent said terminal plate, said bulkhead member having a central aperture co-axial with the cylindrical shell for electrolyte flow between said two compartments;
   a frangible diaphragm closing said aperture in said bulkhead member;
   a cell within said battery compartment having an anode and a cathode, arranged about a central column having a hollow central core extended from said axial aperture in said bulkhead member in said terminal plate;
   said terminal plate having a central bore with a diameter which is somewhat smaller than the internal diameter of said central column and co-axial therewith, said bore extending from the internal side of said terminal plate into a cup carried by said terminal plate;
   an activation ball having a diameter which is slightly larger than the diameter of said bore in said terminal plate, pressed into and held by said bore; and
   an explosive charge positioned within said cup behind said ball, whereby detonation of said explosive charge produces a pressure behind said ball and propels it towards said frangible diaphragm, causing said diaphragm to fracture to thereby allow the electrolyte to flow from the electrolyte compartment into the battery cells and activate the battery.

2. In a battery as claimed in claim 1, said frangible diaphragm being constructed of glass.

3. Apparatus according to claim 1 wherein a plurality of battery cells are provided within said battery compartment.

References Cited
UNITED STATES PATENTS

| 2,847,494 | 8/1958 | Jeannin | 136—114 |
| 2,990,442 | 6/1961 | Barnett | 136—90 |
| 3,173,811 | 3/1965 | Amiet | 136—90 |

WINSTON A. DOUGLAS, Primary Examiner

C. F. LE FEVOUR, Assistant Examiner

U.S. Cl. X.R.

136—90